O. A. SMITH.
METAL WORKING MACHINE.
APPLICATION FILED AUG. 21, 1910.
1,111,411.
Patented Sept. 22, 1914
4 SHEETS—SHEET 2.
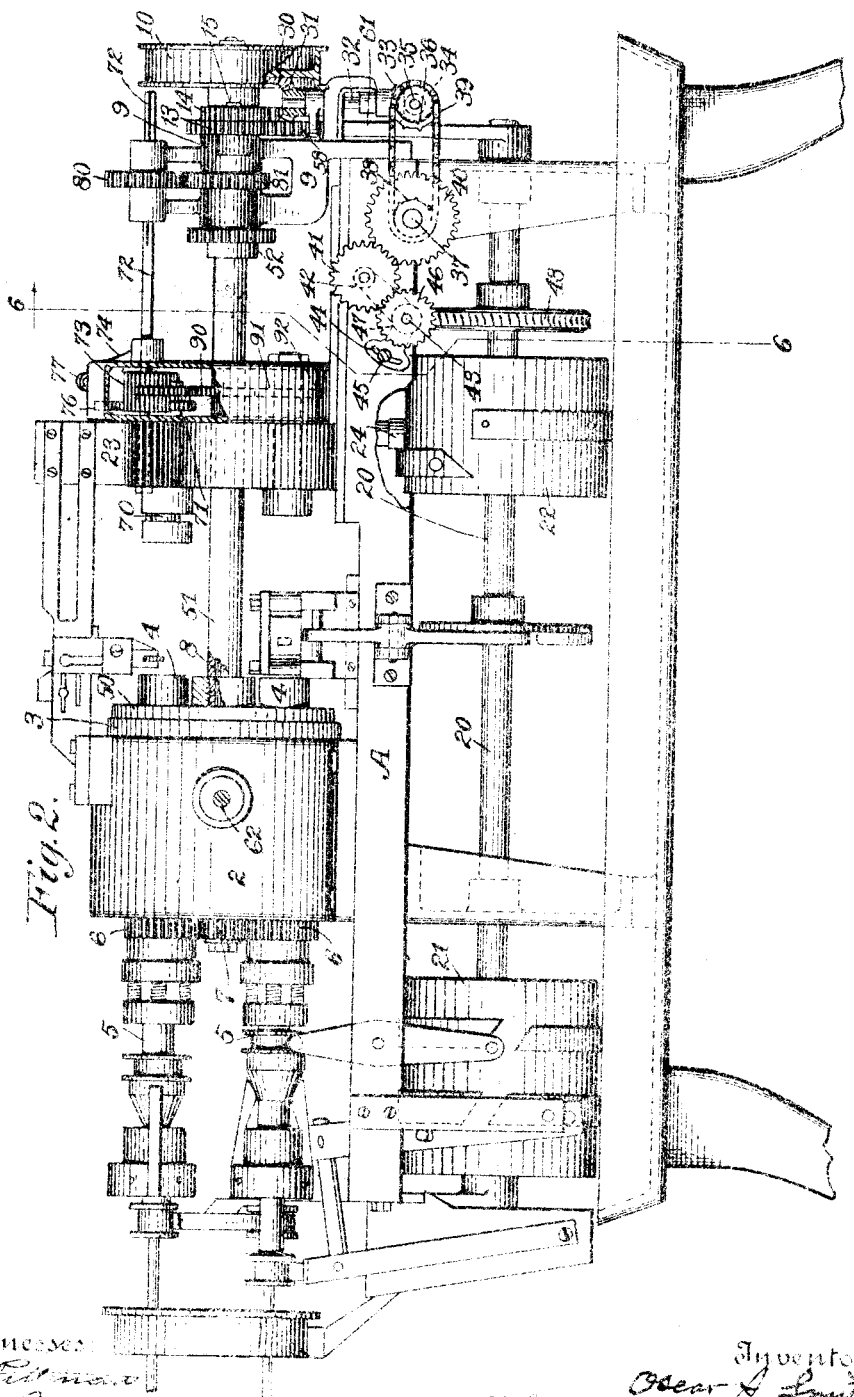

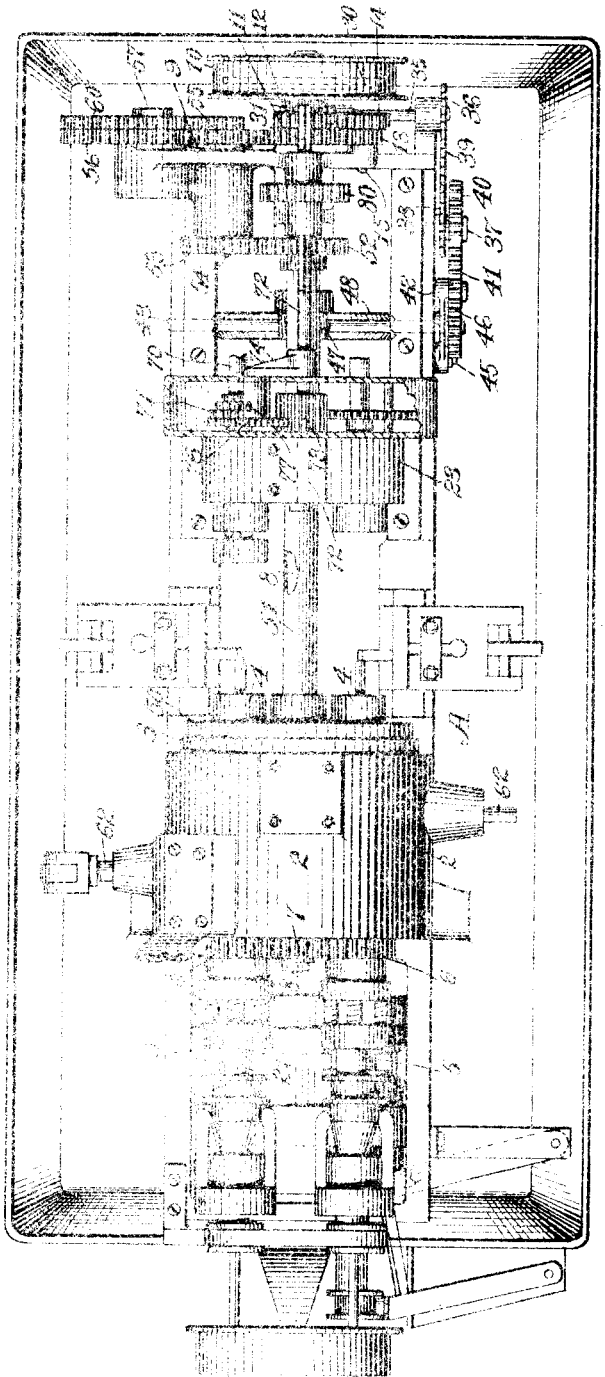

O. A. SMITH.
METAL WORKING MACHINE.
APPLICATION FILED AUG. 17, 1910.
Patented Sept. 22, 1914.
4 SHEETS—SHEET 3.
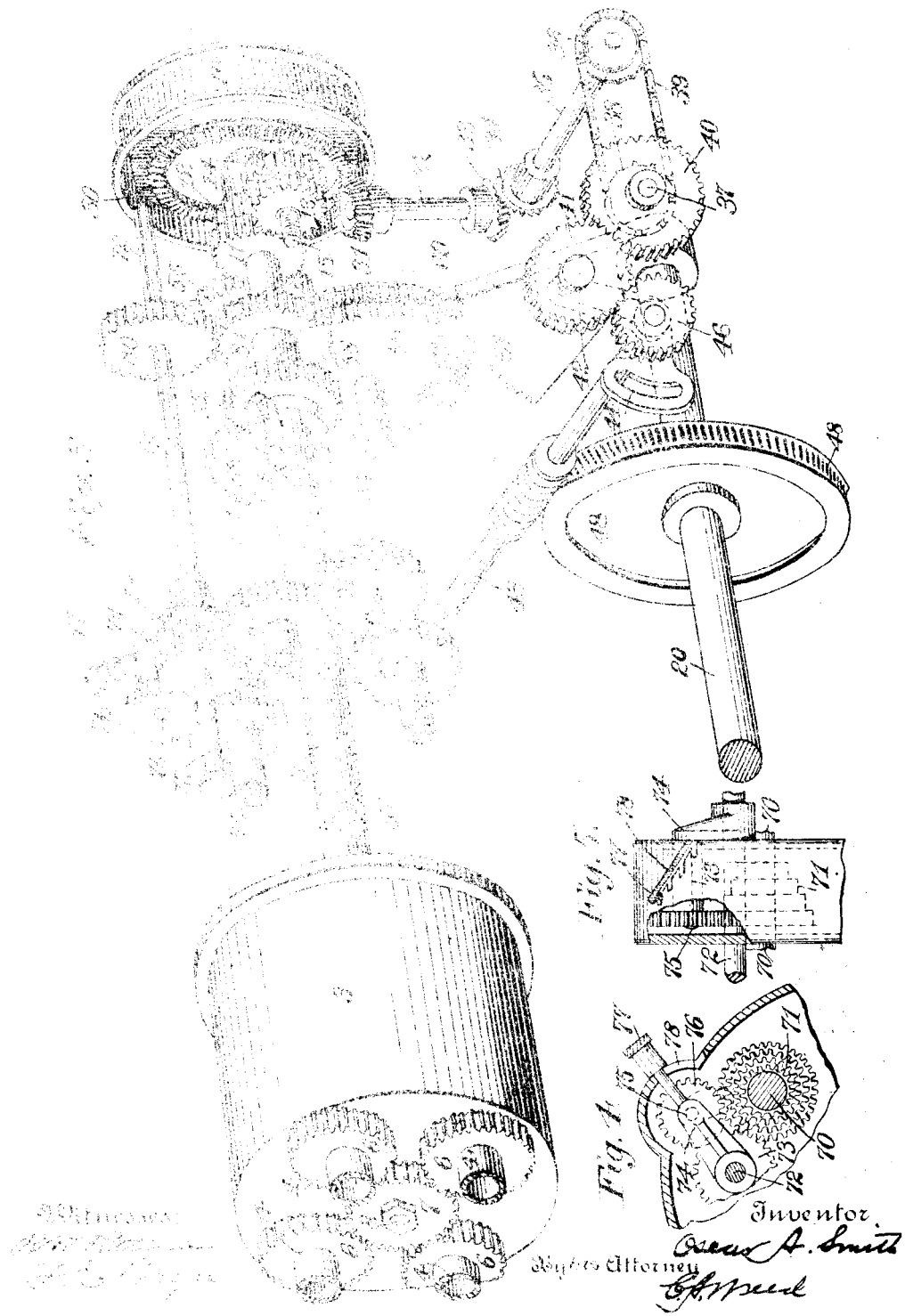
Inventor
Oscar A. Smith O. A. SMITH.
METAL WORKING MACHINE.
APPLICATION FILED AUG. 29, 1911.
1,111,411.
Patented Sept. 22, 1914.
4 SHEETS—SHEET 4.
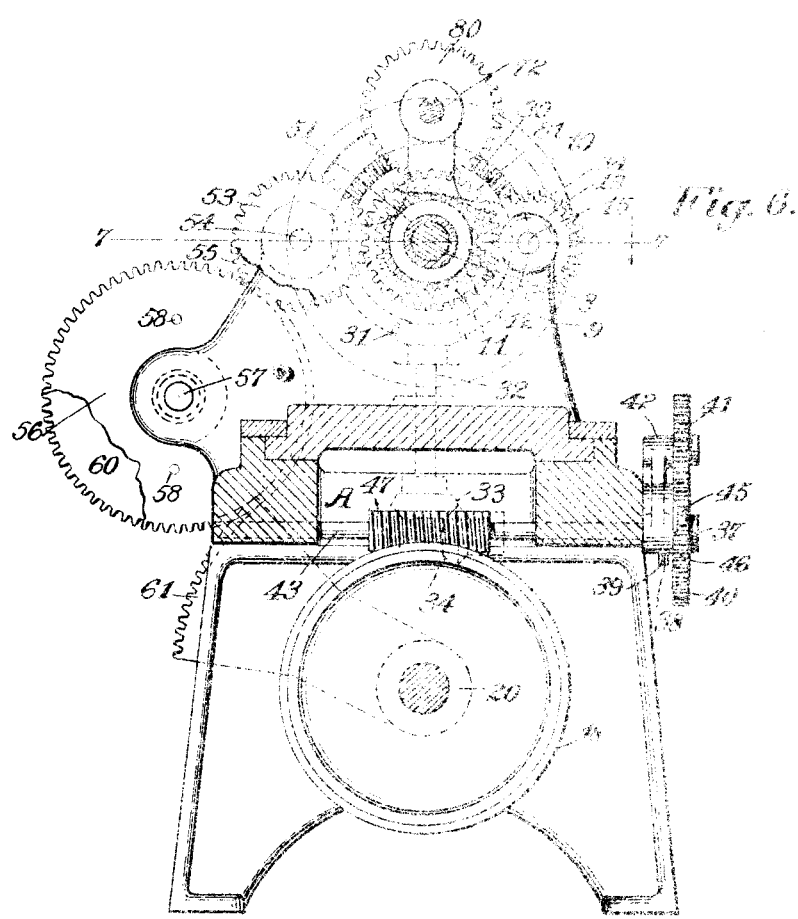
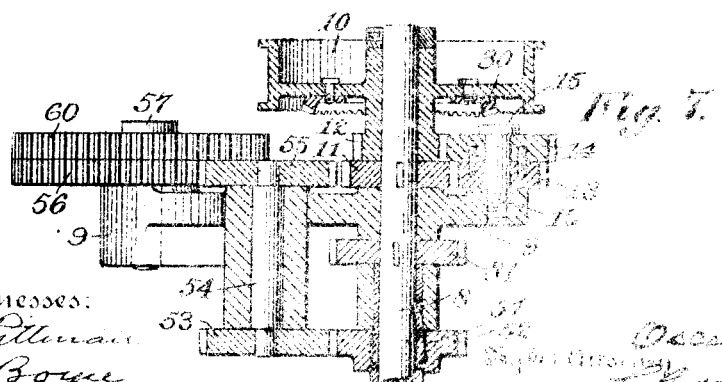
Witnesses:
Inventor
Oscar A. Smith

UNITED STATES PATENT OFFICE.

OSCAR A. SMITH, OF CLEVELAND, OHIO, ASSIGNOR TO THE NATIONAL ACME MANUFACTURING COMPANY, OF CLEVELAND, OHIO, A CORPORATION OF OHIO.

METAL-WORKING MACHINE.

1,111,411.   Specification of Letters Patent.   Patented Sept. 22, 1914.

Application filed August 27, 1910. Serial No. 579,240.

*To all whom it may concern:*

Be it known that I, OSCAR A. SMITH, a citizen of the United States, residing at Cleveland, in the county of Cuyahoga and State of Ohio, have invented certain new and useful Improvements in Metal-Working Machines, of which the following is a specification.

This invention relates to metal working machines of that class known as automatic or multiple spindle screw machines, the object of the invention being to provide a machine of this class having improved means for revolving or indexing the work spindle turret at an accelerated speed without changing or varying the speed of the main driving or tool actuating cam shaft as heretofore, whereby the production of the machine is materially increased, one of the important features of the present improvement being therefore the provision, in a multiple spindle screw machine having any desired number of spindles, of a rotating shaft driven at a constant or uninterrupted speed at all times, while the work spindle turret is rotated at rapid or increased speed as compared with the speed of such main driving shaft when indexing from one position to another, either successively or in alternation, the present construction being an improvement in part upon that shown and described in Patent No. 655,974, dated August 14, 1900.

A further object of the invention is the provision, in a multiple spindle screw machine having a rotating work turret and a sliding tool carrier, both mounted on the bed thereof, of improved means for indexing the work turret.

A further object of the invention is the provision, in a machine of the class described, of improved means for changing the speed of the turret without varying the speed of the main driving or cam shaft.

A further object of the invention is the provision of an improved cam shaft driving mechanism by means of which the rotating work spindle turret may be rotated either at substantially the same speed as the main driving or cam shaft or at an accelerated speed as compared therewith without the necessity of reducing the speed of such shaft intermediate the indexing of such turret.

A further object of the invention is the provision of an improved multiple spindle machine having a constant or uninterrupted speed main driving or cam shaft for controlling the indexing of the rotary turret and the sliding tool carrier, in which, however, the speed of such main driving or cam shaft may be readily changed with relation to its driving means.

A further object of the invention is the provision of an improved multiple spindle machine in which the rotating work spindle turret may be rotated or indexed at an accelerated speed and the sliding tool carrier have an accelerated movement during such rotary movement or indexing of the turret and a slower movement intermediate such indexing, while the main driving or cam shaft controlling such indexing and sliding movements of the tool carrier is maintained at a constant speed at all times.

In the drawings accompanying and forming part of this specification, Figure 1 is a top plan view of a multiple spindle screw machine having this improved mechanism combined therewith, parts thereof being shown in section more clearly to illustrate the present improvement; Fig. 2 is a side elevation thereof, with parts thereof broken away or shown in section; Fig. 3 is a perspective view of the turret and the main driving or cam shaft driving machanism detached from the machine; Figs. 4 and 5 are detail, partly sectional, views illustrating the change-gear mechanism for the tool spindles; Fig. 6 is a cross sectional view taken in line 6—6, Fig. 2, looking in the direction of the arrow in said Fig. 2; and Fig. 7 is a cross sectional view taken in line 7—7, Fig. 6.

Similar characters of reference indicate corresponding parts throughout the figures of the drawings.

The present improved machine comprises a suitable supporting frame or bed A, having mounted thereon a turret casing 2, within which is located a rotary work spindle turret or cylinder 3, which may carry any desired number of work spindles 4, four of which are shown herein. Each of these work carrying spindles is provided with the usual clutch 5 and a gear 6 in mesh with a gear 7 located on the end of the work spindle driving shaft 8, which passes through and is rotatable within the turret 3 and by means of which rotary movement is imparted to the rotary work spindles mounted within the turret. The opposite end of this shaft 8 has a bearing in a bracket 9 secured to the bed of the machine, and loosely mounted upon the end of this shaft is a driving pulley 10, which is constantly driven from any suitable source of power and by means of which motion is imparted to the various parts of the machine. Keyed on the end of the spindle driving shaft 8, adjacent to the driving pulley 10, is a gear 11, and secured to or forming a part of the hub of the driving pulley 10 is a gear 12, which gears mesh with a pair of gears 13 and 14 mounted upon a stud 15 carried by the bracket 9, which latter gears are shown doweled together, (see Fig. 7), and through the medium of which meshing gears rotary movement is imparted from the pulley 10 to the spindle driving shaft, and from thence to the spindles 4, and by changing the ratio of the gears the speed of the work spindles may be varied in a manner which will be readily understood.

For indexing the rotary work carrying spindle turret or cylinder 3, suitable mechanism is provided, comprising a main driving or cam shaft, which in the present instance is rotated at a constant or unvarying speed. This main driving or cam shaft 20 is mounted on the bed of the machine below the spindle driving shaft 8, and at one end carries cam drum 21 having cam straps for operating the work spindle clutches 5, and adjacent to its opposite end carries a cam drum 22 having cam straps for shifting the sliding tool carrier 23 mounted to slide upon the bed of the machine, and through which passes the spindle driving shaft 8 and the sleeve thereof hereinafter referred to. This sliding tool carrier is provided with a depending cam engaged stud 24, by means of which the tool carrier is moved back and forth toward and from the turret. This sliding tool carrier carries the rotary tool spindles, usually corresponding in number with the number of work spindles carried by the turret.

For driving the main driving or cam shaft, and thereby rotating the work spindle turret, the driving pulley 10 has secured thereto a bevel gear 30 in mesh with a bevel gear 31 keyed to a vertically supported shaft 32 having a bearing in the bracket 9. On the lower end of this shaft 32 is another bevel gear 33 in mesh with a bevel gear 34 secured to the end of a shaft 35 likewise supported by the bracket 9, and on the end of which shaft 35 is mounted a chain sprocket 36. On the bed of the machine is housed a stud 37, on the outer end of which is mounted a chain sprocket 38, the two chain sprockets 36 and 38 being connected by a driving chain 39. Fastened to the chain sprocket 38 is a gear 40, in mesh with which is an idler gear 41 mounted on a rocker arm 42 loosely mounted on the end of a worm shaft 43 mounted on the bed of the machine, and which rocker arm 42 is provided with a segmental slot 44 and a clamping screw 45 by means of which it may be adjusted with its gear in the proper position to have any particular sized gear mesh with the gear 38 and the gear 46 secured to the worm shaft 43. By changing certain of these gears, it will be apparent that any desired speed may be imparted to the main driving or cam shaft. Carried by the worm shaft is a worm 47 in mesh with a worm wheel 48 secured to the shaft 20.

From the foregoing it will be observed that a continuous or uninterrupted drive from the pulley 10 to the shaft 20 is obtained.

Bolted to the work spindle turret or cylinder 3 is a disk 50, and centrally of this disk there is secured a sleeve 51 through which the spindle driving shaft 8, hereinbefore referred to, passes, this sleeve clearing said shaft 8 and the opposite end having a bearing, like the shaft 8, in bracket 9 secured to the bed of the machine, (see Fig. 7). On this sleeve 51 is secured a gear 52, which is in mesh with a gear 53 fixed to a supplemental shaft 54 suitably housed in the bracket 9. On the opposite end of this supplemental shaft 54 is fixed a change gear 55, which in turn meshes with a change gear 56 mounted on a stud 57 likewise supported on the bracket 9 and fastened by means of dowel pins 58 to a master gear 60, which is of the same size as the work spindle cylinder or turret and is provided with the proper number of teeth to suit the requirements of the particular multiple spindle machine with which it is to be used.

On the shaft 20 is secured a segmental gear 61 set to mesh at the proper time with the master gear 60. This segment is cut with the proper number of teeth to suit the particular machine with which it is to be used. The character of this segmental or fan-shaped gear 61 and the master gear depends merely upon the number of spindles which are to be indexed in the rotary turret. The driving of the cam shaft from the driving pulley 10, which cam shaft, as hereinbefore stated, is driven at an uninterrupted speed, carries the segmental gear 61 into contact at certain periods with the master gear 60, by means of which the gear 56 secured thereto, and the train of gears 55, 53 and 52 are rotated, and consequently the sleeve 51, and thereby the turret 3, during the time that the master gear 60 and fan gear 61 are in mesh, the turret remaining stationary at other times, the usual locking bolts 62 being provided for locking the turret in its stationary position. By this means the work spindle turret or cylinder is indexed the required distance, the speed of which indexing is controlled by the change gears 55 and 56, so that, without varying or changing the speed of the cam shaft, the work spindle turret may be rotated and indexed at whatever speed may be desired, according to the work that is to be done, and usually at an accelerated speed as compared with the speed of the cam shaft, whereby the product of the machine will be materially increased, and this, as stated, while the cam shaft is driven at a continuous and uninterrupted speed. In practice also, the sliding tool carrier will have an accelerated movement during the rotary movement or indexing of the turret, this being determined by the shape of the cams carried by the cam drum 22.

For driving the die spindle carried by the sliding tool carrier suitable driving mechanism is provided. On the die spindle 70 is keyed a series of spur gears 71, shown as four in number, although any desired number may be used according to the variation of speed required or desired for the die spindle. On a shaft 72 is keyed a spur gear 73 having a width equal to the combined width of the series of spur gears 71 on the die shaft 70. On the shaft 72 is hung a yoke 74, carrying a stud 75 having mounted thereon a gear 76 in mesh with the wide gear 73 and with one of the gears of the set 71, the gear 76 being shiftable by means of the yoke 74 and the locking device 77 transversely of the set of gears 71 into position to mesh with any one of the set, and also shiftable through the medium of the swinging yoke so as to engage either the larger or the smaller, or the intermediate gears of the set 71, it being locked in mesh with the particular gear by the locking device 77 and the indexing station 78, Fig. 5.

On the shaft 72 is keyed, by means of a sliding key, a gear 80 in mesh with a gear 81 keyed to the spindle driving shaft 8, by means of which motion is imparted from the driving pulley 10, through the meshing gears 81 and 80 and the wide gear 73, to the die spindle shaft 70 at the desired speed, the other tool spindle shafts being driven by gears 90, 91 and 92 from the same wide gear 73.

In multiple spindle machines in which a fan gear in mesh with a gear fixed to the turret is utilized to rotate the turret, no work can be performed either by the forming, cutting off or tool slide tools until the cylinder has been indexed from one position to the other, the loss of actual working time being approximately the proportion of the full circle which is occupied by the width of the fan gear. With the present improved method of using compound gearing and the change gears 55 and 56, it will be seen that by making the change gears 55 and 56 of the ratio of two to one and having the master gear 60 of the same size as the cylinder it is necessary to have the fan gear 61 only half as wide to index the cylinder a one-quarter turn as is the case where the fan gear is directly geared with the cylinder, so that with this improvement, in a certain sized machine there is a gain of from three to four inches on working length of forming and cut off cams, and taking advantage of this extra length the lead of the cams can be made that much easier. For instance, if the machine were running to the limit of the cams for cutting off and forming, and the cam had a lead of three-eighths of an inch to one revolution of the cam shaft, the speed of the cam shaft would be increased so that the feed of the tool slide would be at the same rate as it was when at the limit of the shorter cam in the method heretofore used, thus giving that much more production, since increase in the speed of the cam shaft means increase of product.

By the present improvement it is also entirely practicable to index the turret a half turn instead of a quarter turn; whereas in the method heretofore used, of indexing with the fan gear geared to the cylinder, there is a loss of the width of the fan gear in the length of the cam, which of course means less of production, inasmuch as the more cam that is used the easier the cutting tools work; so that the fan gear, to index two positions, or a half turn, under the old method would have to be twice the width of the present fan gear that is utilized in such machines; but this would necessitate the cutting off of three to four inches of the forming, cut off and tool slide cam, whereas in the present method of indexing, the fan gear 61, for indexing a half turn would need only to be the width of the fan gear now used in the old method for indexing a one-quarter turn. Thus in the present improvement there is the advantage of the present lengths of cams, or, in other words, the cams now used in connection with the quarter indexing of a machine of this class would be all right in length for a machine with which it was intended to index the turret a half turn by utilizing the means shown herein for operating the cam shaft.

The advantages of a half-turn index machine are many, as in some cases two finished pieces may be cut off and new lengths of bars fed out in the two bottom spindles, while on the two top spindles the ends can be turned and head or neck formed. Furthermore, in working on brass a greater speed of the cutting tools and dies is possible, and therefore desirable, than in working on steel. Consequently it is desirable to have a change-gear mechanism for controlling the speed of the tools, including the threading tool, and as the same reasoning applies to the rotation of the work spindles it is therefore desirable to have a change-speed mechanism for changing the speed of the work spindles.

From the foregoing it will therefore be apparent that in the present improvement a material saving in the loss of time is obtained in the operation of the several parts, while the turret may be indexed at the desired accelerated speed without varying the speed of the cam shaft, and in consequence a much greater production is obtainable than heretofore.

It will be observed that in the present improvement the turret is indexed, not from its periphery as heretofore, but centrally or axially thereof; that is to say, the turret has, as hereinbefore stated, secured thereto centrally thereof a shaft which rotates therewith and to which shaft intermittent motion is imparted thereby to index the turret in the manner hereinbefore stated. Heretofore, where the turret was indexed from the periphery thereof, either by means of gears or otherwise, this indexing means had a tendency to force the cylinder or turret against the opposite side of its casing before it was possible to revolve the cylinder. This action wears the casing out of round and makes a poor bearing for the cylinder, and this results in a bad fit of the cylinder in its casing and consequently results at times in the production of poor work. But by indexing it in the manner shown the cylinder does not have to be provided with teeth or notches thereon, and consequently it may have a perfect bearing in its casing and will remain so, since it is revolved from the center and there is no side strain on it when revolving. Furthermore, when the cylinder is indexed from its center instead from its periphery it revolves much easier within its casing, for the reason that when turned from the center the friction against the side of its casing is evenly distributed, but when turned from the periphery the friction is much greater on the opposite side from that where the mechanism is in contact with the cylinder for turning it, and consequently will wear the cylinder out of round or true. Furthermore, the tubular sleeve or shaft which is connected with the turret centrally thereof is also effective to support the cylinder when the tools are operating on the bars in the spindles and largely eliminates the down thrust wear of the cylinder and casing.

I claim as my invention:

1. In an automatic multiple spindle machine, the combination of a rotary turret, a driving shaft, means for rotating it at a constant or uninterrupted speed, and means driven from said driving shaft for intermittently indexing the turret from the center thereof at a rapid speed equal to or greater than the speed of said driving shaft, said means including a shaft secured to said turret and connecting means between said shaft and the driving shaft.

2. In an automatic multiple spindle machine, the combination of a rotary turret, a cam carrying shaft, means for rotating said cam carrying shaft at a constant or uninterrupted speed, and means driven from said cam carrying shaft for intermittently indexing the turret from the center thereof at a rapid speed equal to or greater than the speed of said cam carrying shaft, said means including a shaft secured to said turret and connecting means between said shaft and the cam carrying shaft.

3. In an automatic multiple spindle machine, the combination of a rotary turret, a shiftable tool carrier, a driving shaft, means for rotating it at a constant or uninterrupted speed, means carried by said shaft for reciprocating the shiftable tool carrier, and means driven from said shaft for intermittently indexing the turret from the center thereof at a rapid speed equal to or greater than the speed of said driving shaft and between the time that said tool carrier backs away from its working position and returns to said position relatively to the turret, said means including a shaft secured to said turret and gearing between said shaft and the driving shaft.

4. In an automatic multiple spindle machine, the combination of a rotary turret, a sliding tool carrier, a driving shaft, means driven thereby for shifting the tool carrier toward and from the turret, a part of such movement being at a speed different from another part of such movement, means for rotating said shaft at a constant or uninterrupted speed, and means driven from said shaft for intermittently indexing the turret from the center thereof at a speed equal to or greater than the speed of said driving shaft and after the tool carrier has been shifted partly away from the turret, said means including a shaft secured to said turret and connecting means between said shaft and the driving shaft.

5. In an automatic multiple spindle machine, the combination of a rotary turret having a plurality of work carrying spindles, a sliding tool carrier having a plurality of tools, a cam carrying shaft, cams thereon for imparting a slow movement and a quick movement to the tool carrier at different times, means for rotating said cam carrying shaft at a constant or uninterrupted speed, and means driven from said cam carrying shaft for intermittently indexing the turret from the center thereof at an accelerated speed as compared with the speed of said cam carrying shaft and subsequent to a part of the slow movement of said tool carrier, said means comprising a shaft secured to said turret concentrically thereof and connecting means between said shaft and the cam carrying shaft.

6. In an automatic multiple spindle machine, the combination of a rotary turret, a sliding tool carrier, a cam carrying shaft, cams thereon for reciprocating the sliding tool carrier, means for rotating said cam carrying shaft at a constant or uninterrupted speed, and means driven from said cam carrying shaft for intermittently indexing the turret from the center thereof at a speed equal to or greater than the speed of said cam carrying shaft and between the time that said tool carrier backs away from its working position and returns to said position relatively to said turret and comprising a disk secured to said turret, a shaft secured to said disk concentrically with the turret and gearing between said shaft and the cam carrying shaft.

7. In an automatic multiple spindle machine, the combination of a rotary turret, a sliding tool carrier, a cam carrying shaft, cams thereon for reciprocating the sliding tool carrier, means for rotating said cam carrying shaft at a constant or uninterrupted speed, and means driven from said cam carrying shaft for intermittently indexing the turret from the center thereof at a speed equal to or greater than the speed of said cam carrying shaft and between the time that said tool carrier backs away from its working position and returns to said position relatively to said turret and comprising a disk secured to said turret, a shaft secured to said disk concentrically with the turret and gearing between said shaft and the cam carrying shaft, and including a gear of substantially the same diameter as the turret.

8. In an automatic multiple spindle machine, the combination of a rotary turret, a sliding tool carrier, a cam carrying shaft, cams thereon for reciprocating the sliding tool carrier, means for rotating said cam carrying shaft at a constant or uninterrupted speed, and means driven from said cam carrying shaft for intermittently indexing the turret from the center thereof at a speed equal to or greater than the speed of said cam carrying shaft and between the time that said tool carrier backs away from its working position and returns to said position relatively to said turret and comprising a disk secured to said turret, a shaft secured to said disk concentrically with the turret and gearing between said shaft and the cam carrying shaft, and including a gear of substantially the same diameter as the turret and means for intermittently actuating said master gear.

9. In an automatic multiple spindle machine, the combination of a rotary turret, a shiftable tool carrier, a cam carrying shaft, cams thereon for reciprocating the tool carrier, means for rotating said cam carrying shaft at a constant or uninterrupted speed, and means driven from said shaft for intermittently indexing the turret from the center thereof at a speed equal to or greater than the speed of said shaft and between the time that said tool carrier backs away from its working position and returns to such position relatively to the turret and comprising a shaft secured to the turret centrally thereof, a gear of substantially the same diameter as the turret, gearing between said gear and turret shaft, and means for intermittently actuating said gear.

10. In an automatic multiple spindle machine, the combination of an intermittently actuated rotary turret, a cam carrying shaft, means for rotating it at a constant or uninterrupted speed, and means for intermittently rotating the turret from the center thereof at a speed equal to or greater than that of said shaft, a shaft secured to said turret concentrically therewith, a fan gear carried by said cam shaft, and gearing between said fan gear and turret shaft.

11. In an automatic multiple spindle machine having a bed, the combination of an intermittently actuated rotary turret supported on said bed and adapted to carry work spindles, a tool carrier slidingly supported on said bed and adapted to carry tools, a cam carrying shaft, means for rotating it at a constant or uninterrupted speed, a shaft secured to said turret and passing through said sliding tool carrier, and means for driving said shaft from the cam shaft thereby to intermittently rotate said turret from the center thereof at a speed equal to or greater than that of said cam shaft.

12. In an automatic multiple spindle machine, the combination of an intermittently actuated rotary turret, a cam carrying shaft, means for rotating said shaft at a constant or uninterrupted speed, a shaft secured to said turret concentrically therewith, means for indexing the turret from the center thereof at a speed equal to or greater than said shaft, a gear having a diameter substantially corresponding to that of the turret, means for driving said turret shaft from said gear, and means driven from said cam carrying shaft for intermittently engaging said gear.

13. In an automatic multiple spindle machine, the combination of a rotary turret, a driving shaft, means for rotating said shaft at a constant or uninterrupted speed, a shaft secured to said turret concentrically therewith and driven from said driving shaft for intermittently indexing the turret from the center thereof at a speed equal to or greater than the speed of said driving shaft, and means for varying the speed of said driving shaft without varying the speed of the rotating means for said shaft.

14. In an automatic multiple spindle machine, the combination of a rotary turret, a driving shaft, means for rotating said shaft at a constant or uninterrupted speed and including means for varying the speed of said driving shaft without varying the speed of said shaft rotating means, and a shaft secured to said turret concentrically therewith and driven from said driving shaft for intermittently rotating the turret from the center thereof at a speed equal to or greater than the speed of said driving shaft.

15. In an automatic multiple spindle machine, the combination of a rotary intermittently actuated turret, a rotatable cam carrying shaft, a gear substantially corresponding in diameter with the turret, means secured to the cam carrying shaft and intermittently in mesh with said gear, a shaft secured to said turret concentrically therewith, gearing between said gear and said turret shaft for intermittently actuating the turret from the center thereof, and means for driving the cam carrying shaft at a constant or uninterrupted speed and including means for varying the speed of said cam carrying shaft without varying the speed of said driving means.

16. In an automatic multiple spindle machine, the combination of a rotary turret, a sliding tool carrier, a cam carrying shaft, cams thereon for reciprocating the sliding tool carrier, means for rotating said cam carrying shaft at a constant or uninterrupted speed, means driven from said cam carrying shaft for intermittently indexing the turret from the center thereof at a speed equal to or greater than the speed of said cam carrying shaft and between the time that said tool carrier backs away from its working position and returns to said position relatively to the turret, said means comprising a disk secured to said turret, a shaft secured to said disk concentrically with the turret and gearing between said shaft and the cam carrying shaft, and means for varying the speed of the cam carrying shaft without changing the speed of the rotating means therefor.

17. In an automatic multiple spindle machine, the combination of a rotary turret, a driving shaft, means for rotating said driving shaft at a constant or uninterrupted speed, means driven from said shaft for intermittently indexing the turret from the center thereof at a speed equal to or greater than the speed of said shaft, said means including a shaft secured to said turret and gearing between said shaft and the driving shaft, and means for varying the speed of the turret without varying the speed of said driving shaft.

18. In an automatic multiple spindle machine, the combination of a tool carrier and a rotary turret supported for reciprocatory and rotating movements respectively, a cam carrying shaft, cams thereon for imparting a slow movement to the tool carrier at one time and a quick movement thereto at another time, means for rotating said cam carrying shaft at a constant or uninterrupted speed, means driven from said cam shaft for intermittently indexing the turret at a speed equal to or greater than the speed of said shaft and subsequent to a part of the slow movement of said tool carrier, and means for varying the speed of the turret without varying the speed of the cam shaft.

19. In an automatic multiple spindle machine, the combination of a rotary intermittently actuated turret, a cam carrying shaft, means for driving said shaft at a constant or uninterrupted speed, means for varying the speed of said shaft without changing the speed of its driving means, means driven by said shaft for intermittently rotating the turret, and means for changing the speed of said turret without varying the speed of said cam carrying shaft.

20. In an automatic multiple spindle machine, the combination of a rotary intermittently actuated turret, a cam carrying shaft, a master gear substantially corresponding in diameter with the turret, means secured to the cam shaft and intermittently in mesh with the master gear, gearing between the master gear and the turret for intermittently actuating the latter and including means for varying the speed of the turret without changing the speed of the cam carrying shaft, and means for driving the cam carrying shaft at a constant or uninterrupted speed and including means for varying the speed of said cam carrying shaft without varying the speed of the driving means therefor.

21. In an automatic multiple spindle machine, the combination of a tool carrier and a rotary turret supported for reciprocatory and rotating movements respectively, a cam carrying shaft, cams thereon for imparting a slow movement to the tool carrier at one time and a quick movement thereto at another time, means for rotating said cam shaft at a constant or uninterrupted speed and including means for varying the speed of said cam carrying shaft without affecting the speed of its rotating means, and means driven from said cam carrying shaft for intermittently indexing the turret at a speed equal to or greater than the speed of said cam carrying shaft subsequent to a part of the slow movement of said tool carrier and including means for varying the speed of said turret without affecting the speed of said cam shaft.

22. In an automatic multiple spindle machine, the combination of a rotary intermittently actuated turret, rotatable spindles carried thereby, a driving shaft, means for actuating said shaft at a constant or uninterrupted speed, means secured to said turret concentrically therewith and driven from said shaft for intermittently actuating the turret from the center thereof at a speed equal to or greater than the speed of said driving shaft, means for rotating the spindles, and means for varying the speed of rotation of said spindles without affecting the speed of the spindle driving means.

23. A metal working machine embodying a bed, a tool carrier shiftably supported on said bed, a turret supported for rotative movement, and differential speed actuating mechanism in operative connection with the tool carrier and turret and adapted for imparting a variable movement to the tool carrier and a quick rotative movement to the turret after the tools have left the work, said mechanism including a shaft secured to said turret concentrically therewith.

24. In a machine of the class described, the combination of a rotary intermittently actuated turret, a rotatable shaft secured thereto, a gear carried by said shaft, a master gear, gearing between said master gear and the shaft gear, a cam shaft, means actuated thereby and intermittently in engagement with the master gear, and means for driving the cam shaft at a predetermined speed.

25. In a machine of the class described, the combination of a rotary intermittently actuated turret, a rotatable shaft secured thereto, a gear carried by said shaft, a master gear, change-speed gearing between said master gear and the shaft gear, a cam shaft, a gear secured thereto and intermittently in mesh with the master gear, and means for driving the cam shaft at a predetermined speed.

26. In a machine of the class described having a bed, the combination of a rotary intermittently actuated turret mounted thereon, and adapted to carry work spindles, a tool carrier slidingly mounted on said bed and adapted to carry tools, and means for intermittently indexing said turret from the center thereof and including means passing through said sliding tool carrier and secured to said work turret.

27. In a machine of the class described, the combination of a rotary intermittently actuated turret, a driving shaft, means for driving said shaft at a constant or uninterrupted speed, and means secured to said turret concentrically therewith and driven from said shaft for indexing said turret from the center thereof.

28. In a multiple spindle screw machine, the combination of a rotary turret and a tool carrier, a shaft having means for advancing and retracting the tool carrier, means for driving said shaft, a shaft secured at its inner end to said turret for rotating the same, and mechanism connecting said shafts and effective to rotate said turret intermittently but at a higher speed than said first shaft.

29. In a multiple spindle screw machine, the combination of a rotary turret, a tool carrier, a shaft having means for advancing and retracting the tool carrier, means for driving said shaft, a shaft rigidly connected to the turret for rotating the same, and gearing connecting said shafts and including an intermittently meshing gear and effective to rotate said last shaft intermittently but at a higher speed than said first shaft.

30. In a multiple spindle screw machine, the combination of a rotary turret and a tool carrier, a shaft having cams for advancing and retracting said tool carrier, means for driving said shaft at an uninterrupted speed, a shaft rigidly connected to the turret for rotating the same, and gearing connecting said shafts for driving the turret intermittently at a higher rate of speed than the speed of said first shaft.

31. In a machine of the class described, the combination of a rotary intermittently actuated turret, a rotatable cam shaft, a master gear corresponding in diameter with the turret, a fan gear secured to the cam shaft and intermittently in mesh with the master gear, and gearing between the master gear and the turret for intermittently actuating the latter at an accelerated speed as compared with the speed of the cam shaft.

32. In a multiple spindle screw machine, the combination of a rotary turret and a tool carrier, a shaft having means for advancing and retracting said tool carrier, means for driving said shaft at a constant or uninterrupted speed, a shaft rigidly connected to the turret for rotating the same, and gearing connecting said shafts and intermittently rotated to intermittently rotate said last shaft and thereby the turret but at a higher speed than said first shaft.

33. In a machine of the class described, the combination of a rotary intermittently actuated turret, a rotatable shaft secured thereto centrally thereof for rotation therewith, a gear carried by said shaft, a driving gear, gearing between said driving gear and the shaft gear, and means for intermittently actuating said driving gear.

34. In a machine of the class described, the combination of a rotary intermittently actuated turret, a rotatable shaft secured thereto centrally thereof for rotation therewith, a gear carried by said shaft, a driving gear, gearing between said driving gear and the shaft gear, a cam carrying shaft, means carried thereby and intermittently in mesh with the driving gear, and means for driving said cam carrying shaft at an uninterrupted or constant speed.

35. In a machine of the class described, the combination of a rotary intermittently actuated turret, a rotatable shaft secured thereto centrally thereof for rotation therewith, a gear carried by said shaft, a driving gear, gearing between said driving gear and the shaft gear, a cam carrying shaft, means carried thereby and intermittently in mesh with the driving gear, and means for driving said cam carrying shaft at an uninterrupted or constant speed and including means for varying the speed of said cam carrying shaft without affecting the speed of the driving means therefor.

36. In a machine of the class described, the combination of a rotary intermittently actuated turret, a rotatable shaft secured thereto centrally thereof for rotation therewith, a gear carried by said shaft, a master gear, gearing between said master gear and the shaft gear and including means for varying the speed of rotation of said turret without affecting the speed of said master gear, cam carrying shaft, means secured thereto and intermittently in mesh with the master gear, and means for driving the cam carrying shaft at a predetermined speed and including means for varying the speed of said cam carrying shaft without affecting the speed of the driving means therefor.

37. In a machine of the class described, the combination of a spindle driving shaft, a rotary intermittently actuated turret, spindles carried thereby, means for driving said spindles from the spindle driving shaft, a tubular shaft secured to said turret and rotatable therewith and through which the spindle driving shaft passes, a gear fixed to said tubular shaft, a master gear, gearing intermediate said master gear and the gear fixed to said tubular shaft, a cam carrying shaft, means actuated by said cam carrying shaft and intermittently in engagement with the master gear for imparting intermittent motion from the cam shaft to the turret, and means for driving said cam carrying shaft.

38. In a multiple spindle screw machine, the combination of a rotary turret and a tool carrier, a shaft having cams for advancing and retracting the tool carrier, means for driving said shaft, a tubular shaft for rotating said turret, and adapted to receive a shaft of the machine and mechanism connecting said shafts and effective to rotate said tubular shaft intermittently but at a higher speed than said first shaft.

39. In a machine of the class described, the combination of a spindle driving shaft, a rotary intermittently actuated turret, spindles carried thereby, means for driving said spindles from the spindle driving shaft, a tubular shaft secured to said turret and rotatable therewith and through which the spindle driving shaft passes, a gear fixed to said tubular shaft, a master gear, gearing intermediate said master gear and the gear fixed to said tubular shaft, a cam carrying shaft, means actuated by said cam carrying shaft and intermittently in engagement with the master gear for imparting intermittent motion from the cam shaft to the turret, and means for driving said cam carrying shaft at a constant or uninterrupted speed.

40. In a machine of the class described, the combination of a spindle driving shaft, a rotary intermittently actuated turret, spindles carried thereby, means for driving said spindles from the spindle driving shaft, a tubular shaft secured to said turret and rotatable therewith and through which the spindle driving shaft passes, a gear fixed to said tubular shaft, a master gear, gearing intermediate said master gear and the gear fixed to said tubular shaft, a cam carrying shaft, means actuated by said cam carrying shaft and intermittently in engagement with the master gear for imparting intermittent motion from the cam shaft to the turret, and means for driving said cam carrying shaft at a constant or uninterrupted speed and including means for varying the speed of said cam carrying shaft without changing the speed of its driving means.

41. In a machine of the class described, the combination of a rotary intermittently actuated turret having work carrying spindles, a shaft for imparting motion to said spindles, a tubular shaft secured to the turret and through which said spindle driving shaft extends, a driving pulley loosely mounted on said spindle driving shaft, gearing for driving said spindle driving shaft from the pulley, and means for driving said tubular shaft thereby to rotate the turret.

42. In an automatic multiple spindle machine having a bed, the combination of a rotary work turret mounted thereon, a reciprocating tool carrier also mounted on said bed, a shaft having cams for advancing and retracting the tool carrier, means for driving said shaft, a shaft passing through said sliding tool carrier and secured to said turret, and mechanism connecting said cam shaft and said turret shaft for intermittently rotating the turret from the center thereof.

43. In an automatic multiple spindle machine having a bed, the combination of a rotary work turret mounted thereon, a reciprocating tool carrier also mounted on said bed, a shaft having cams for advancing and retracting the tool carrier, means for driving said shaft, a shaft passing through said sliding tool carrier and secured to said turret, and mechanism connecting said cam shaft and said turret shaft for intermittently rotating the turret from the center thereof, said turret shaft and cam shaft being located one below the other.

44. In an automatic multiple spindle machine, the combination of a rotary turret and a reciprocating tool carrier, a shaft having cams for advancing and retracting the tool carrier, means for driving said shaft, a shaft having its inner end secured to said turret concentrically thereof for intermittently indexing said turret, mechanism connecting said cam shaft and said turret shaft for intermittently rotating the turret from the center thereof but at a higher speed than said cam carrying shaft, and means for driving said cam carrying shaft at a constant or uninterrupted speed.

45. A metal working machine embodying a bed, a tool carrier shiftably supported on said bed, a turret supported for rotative movement, and differential speed actuating mechanism in operative connection with the tool carrier and turret, and adapted for imparting a variable movement to the tool carrier and a quick rotative movement to the turret after the tools have left the work and including a shaft secured to said turret concentrically therewith, a driving shaft and means for driving it at a constant or uninterrupted speed.

46. In an automatic multiple spindle machine, the combination of a rotary turret and a shiftable tool carrier, a shaft having cams for advancing and retracting the tool carrier, means for driving said shaft, a tubular shaft secured to the turret for rotation therewith, mechanism connecting said shafts and effective to rotate said tubular shaft intermittently, spindles carried by said turret, a spindle driving shaft within said tubular shaft, and means for driving it.

47. In an automatic multiple spindle machine, the combination of a rotary intermittently actuated turret and a shiftable tool carrier, a series of three shafts, a pair thereof extending one into another and one thereof secured to and rotatable with the turret, means carried by the third shaft for reciprocating said tool carrier and rotating one of said pair of shafts intermittently, and means for driving the other of said pair of shafts.

48. A metal working machine embodying a bed, a tool carrier shiftably supported on said bed, a turret supported for rotative movement and differential speed actuating mechanism in operative connection with the tool carrier and turret and adapted for imparting a variable movement to the tool carrier and a quick rotative movement to the turret after the tools have left the work and including a shaft secured to said turret concentrically therewith and a one-piece driving shaft extending from end to end of the machine, said one-piece driving shaft carrying means for intermittently actuating said turret shaft and thereby the turret and shifting the tool carrier.

49. A metal working machine embodying a bed, a tool carrier shiftably supported on said bed, a turret supported for rotative movement, and differential speed actuating mechanism in operative connection with the tool carrier and turret and adapted for imparting a variable movement to the tool carrier and a quick rotative movement to the turret after the tools have left the work and including a shaft secured to said turret concentrically therewith a one-piece driving shaft extending from end to end of the machine, said one-piece driving shaft carrying means for intermittently actuating said turret shaft and thereby the turret and shifting the tool carrier, and means for driving said one-piece shaft at a constant or uninterrupted speed.

50. In a machine of the class described, the combination of a rotary intermittently actuated turret, a rotatable cam shaft, a master gear corresponding in diameter with the turret, means actuated by the cam shaft for intermittently actuating the master gear, and gearing between said master gear and the turret for intermittently actuating the latter at a speed equal to or greater than the speed of the cam shaft.

51. In an automatic multiple spindle machine, the combination of a rotary turret, a driving shaft, means for rotating said shaft, means driven from said driving shaft for intermittently indexing the turret from the center thereof, said means including a shaft secured to said turret concentrically therewith and means for varying the speed of said driving shaft without varying the speed of the rotating means for said shaft.

52. In an automatic multiple spindle machine, the combination of a rotary turret, a driving shaft, means for rotating said driving shaft, means driven from said shaft for intermittently indexing the turret from the center thereof, said means including a shaft secured to said turret concentrically therewith and means for varying the speed of the turret without varying the speed of the driving shaft.

53. In a machine of the class described having a bed, the combination of a rotary work turret, a sliding tool carrier mounted on the bed, a rotatable shaft passing centrally through said sliding tool carrier and work turret, a tubular shaft also passing through said sliding tool carrier and having one end secured to said turret, and means for rotating said tubular shaft thereby to index the turret from the center thereof.

54. In a machine of the class described having a bed, the combination with a rotary work turret, of a sliding tool carrier mounted on the bed, means for indexing the work turret from the center thereof and comprising a shaft secured to said turret and passing centrally through said carrier, and means for rotating said shaft thereby to index the turret.

55. In a machine of the class described having a bed, the combination of a rotary intermittently actuated turret mounted on said bed, a sliding tool carrier also mounted on said bed, and means for indexing said turret from the center thereof and comprising means secured to said turret, a cam shaft located at one side of the means secured to said turret, and means connecting said cam shaft with the means secured to the turret thereby to drive the turret from the center thereof.

OSCAR A. SMITH.

Witnesses:
I. G. LOE,
W. S. CHASE.